United States Patent [19]

Zinser

[11] Patent Number: 4,622,680
[45] Date of Patent: Nov. 11, 1986

[54] HYBRID SUBBAND CODER/DECODER METHOD AND APPARATUS

[75] Inventor: Richard L. Zinser, Schenectady, N.Y.

[73] Assignee: General Electric Company, Lynchburg, Va.

[21] Appl. No.: 661,598

[22] Filed: Oct. 17, 1984

[51] Int. Cl.$^4$ .............................................. G10L 1/06
[52] U.S. Cl. ...................................... 375/25; 375/38; 375/122; 370/118; 381/31; 381/29
[58] Field of Search ........................ 375/25, 27, 34, 38, 375/102, 122; 370/118; 381/29, 31

[56] References Cited

U.S. PATENT DOCUMENTS

| | | | |
|---|---|---|---|
| 4,027,243 | 5/1977 | Stackhouse et al. | 320/63 |
| 4,382,298 | 5/1983 | Evans | 371/6 |
| 4,455,649 | 6/1984 | Esteban et al. | 370/118 |
| 4,464,783 | 8/1984 | Beraud et al. | 381/31 |
| 4,538,234 | 8/1985 | Honda et al. | 381/31 |

OTHER PUBLICATIONS

Crochiere, R. E., Webber, S. A. and Flanagan, J. L., "Digital Coding of Speech in Subbands", Bell Syst. Tech. J., vol. 55 (Oct. 1976), 1069-1085.
Crochiere, R. E., "On the Design of Sub-bands Coders for Low-Bit-Rate Speech Communication", Bell Syst. Tech. J., 56 (May-Jun. 1977), 747-770.
Crochiere, R. E., "Digital Signal Processor- Sub-band Coding", Bell Syst. Tech. J., 60 (Sep. 1981), 1633-1653.
Esteban, D. and Galand, C., "Application of Quadrature Mirror Filters to Split Band Voice Coding Schemes", Proc. 1977 Int. Conf. on Acoustics, Speech and Signal Processing, Hartford, CT, (May 1977), 191-195.
Cummiskey, P., Jayant, N. S. and Flanagan, J. L., "Adaptive Quantization in Differential PCM Coding of Speech", Bell Syst. Tech. J., 52 (Sep. 1973) 1105-1118.
Goodman, D. J. and Wilkinson, R. M., "A Robust Adaptive Quantizer", IEEE Trans. Comm., COM-23 (Nov. 1975), 1362-1365.
Croisier, A., "Progress in PCM and Delta Modulation: Block Companded Coding of Speech Signals", 1974 Int. Zurich Seminar, Proceedings.
Jonston, J. D., "A Filter Family Designed for Use in Quadrature Mirror Filter Banks' Proceedings 1980 Int. Conf. on Acoustics Speech and Signal Processing, Denver, CO, Apr. 1977, 291-294.
Max J., "Quantizing for Minimum Distortion", IRE Trans. Information Theory, IT-6 (Mar. 1960), 7-12.
Boddie, J. R., et al. "Adaptive Differential Pulse-Code-Modulation Coding", The Bell System Technical Journal, vol. 60, No. 7, Sep. 1981, pp. 1547-1561.
Crochiere, R. E., et al., "A 9.6 Kb/s DSP Speech Coder", The Bell System Technical Journal, vol. 61, No. 9, Nov. 1982, pp. 2263-2288.
Smith M. J. T., et al., "A Procedure for Designing Exact Reconstruction Filter Banks for Tree-Structured Subband Coders", Proceedings of the IEEE International Conference on Acoustics, Speech and Signal Processing, Mar. 1984, vol. 2, pp. 27.1.1-27.1.4.
Barnwell, T. P., et al, "A Real Time Speech Subband Coder Using the TMS32010 . . . ".
Fjallbrant, T., et al. "A Speech Signal ATC-System with Short Primary Blocklengths and Microprocessor-based Implementation", . . . , pp. 357-363.

Primary Examiner—Robert L. Griffin
Assistant Examiner—Raymond C. Glenny
Attorney, Agent, or Firm—Nixon & Vanderhye

[57] ABSTRACT

The subband channels of a subband coder/decoder utilize different encoding/decoding algorithms so as to maximize overall signal transmission quality using a digital signal processor having limited digital memory capability. In the exemplary embodiment, a digitized 180-2900 Hz voice band signal is divided into four octave-spaced subbands. The highest frequency subband (1450-2900 Hz) is encoded/decoded using a block companded pulse code modulation (BCPCM) algorithm while each of the lower frequency subbands is encoded/decoded using an adaptive pulse code modulation (APCM) or an adaptive differential pulse code modulation (ADPCM) algorithm. The resulting "hybrid" vocoder tends to maximize the quality of transmitted voice signals while yet permitting implementation within constrained digitial memory capacity and/or constrained transmission channel bandwidth.

18 Claims, 7 Drawing Figures

FUNCTIONAL BLOCK DIAGRAM OF ADPCM CODER/DECODER

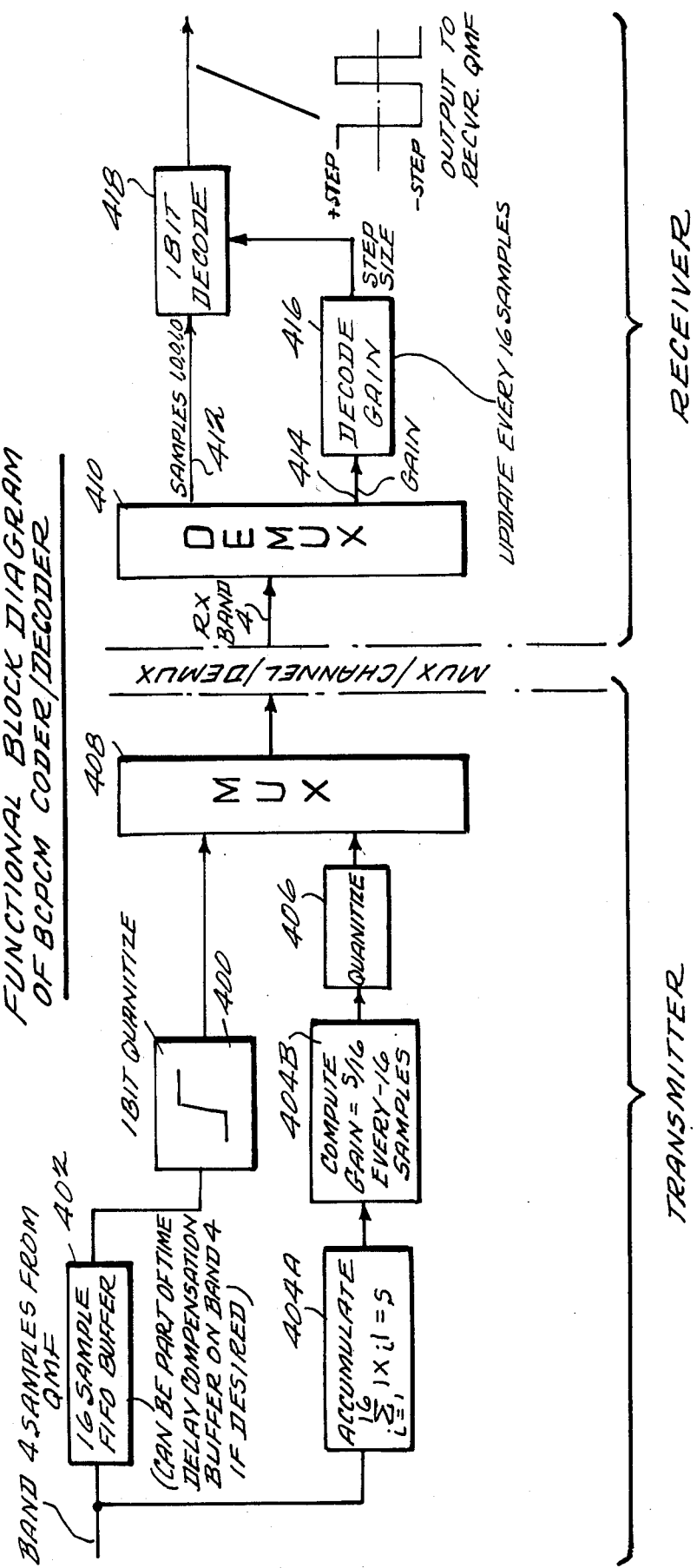

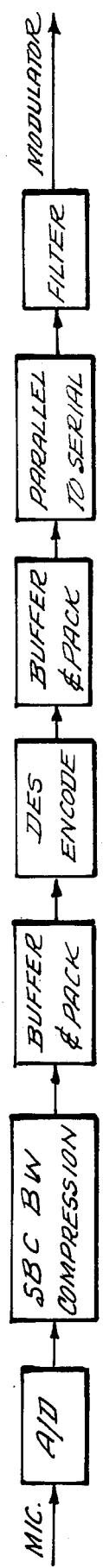
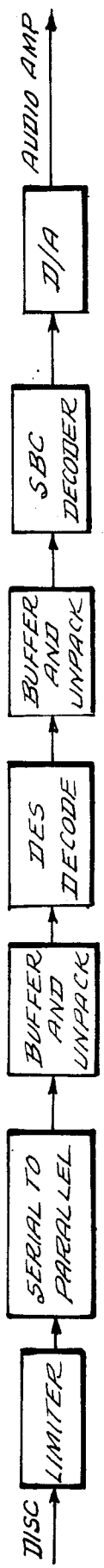

SYSTEM FREQUENCY RESPONSE

HYBRID SUBBAND CODER/DECODER METHOD AND APPARATUS

SPECIFICATION

This invention relates generally to the field of electrical signal coding/decoding for transmission of digital signals over communication channels. More particularly, it relates to an improved type of subband coder/decoder wherein digitized audio voice signals are digitally encoded, transmitted over a communication channel and decoded so as to reconstruct the audio voice signals. As such, this invention will find particular application in voice communication devices such as radios, telephones and the like.

It may also be useful wherever digitized electrical signals of any type are to be band compressed to a lower bit rate for transmission over a limited bandwidth signal transmission channel.

This application is related to the following commonly assigned copending applications:

Ser. No. 661,597 entitled "Cryptographic Digital Signal Transceiver Method and Apparatus" by Szczutkowski et al, filed concurrently herewith;

Serial No. 661,733 entitled "Method and Apparatus for Transceiving Cryptographically Encoded Digital Data" by Szczutkowski et al, filed concurrently herewith; and Serial No. 661,740 entitled "Method and Apparatus for Efficient Digital Time Delay Compensation in Compressed Bandwidth Signal Processing" by Szczutkowski and also filed concurrrently herewith.

Although not required to practice the invention claimed in the present application, the presently preferred exemplary embodiment does utilize these related inventions as will be explained below.

Subband coders of various types, as well as many types of quantized digital signal encoding/decoding algorithms, are well known in the art. For example, the art of subband coder design for a Rayleigh fading channel including discussion of adaptive pulse code modulation (APCM) and block companded pulse code modulation (BCPCM) are discussed in my recent co-authored paper "A Robust 9.6 Kb/s Subband Coder Design for the Rayleigh Fading Channel" by Zinser, Silverstein and Anderson, Proceedings of the IEEE International Conference on Communications, May 1984, Volume 3, pp. 1163-1168. A collection of prior art publications relevant to subband coder design is contained in this paper and is reproduced below (items 1-10) together with additional possibly relevant prior art publications (11-15):

1. Crochiere, R. E., Webber, S. A. and Flanagan, J. L., "Ditigal Coding of Speech in Subbands", Bell Syst. Tech. J., 55 (Oct. 1976), 1069-1085.

2. Crochiere, R. E., "On the Design of Sub-band Coders for Low-Bit-Rate Speech Communication", Bell Syst. Tech. J., 56 (May-June 1977), 747-770.

3. Crochiere, R. E., "Digital Signal Processor: Subband Coding", Bell Syst. Tech. J., 60 (September 1981), 1633-1653.

4. Esteban, D. and Galand, C., "Application of Quadrature Mirror Filters to Split Band Voice Coding Schemes", Proc. 1977 Int. Conf. on Acoustics, Speech and Signal Processing, Hartford, Conn. (May 1977), 191-195.

5. Cummiskey, P., Jayant, N. S. and Flanagan, J. L., "Adaptive Quantization in Differential PCM Coding of Speech", Bell Syst. Tech. J., 52 (September 1973), 1105-1118.

6. Goodman, D. J. and Wilkinson, R. M., "A Robust Adaptive Quantizer", IEEE Trans. Communications, COM-23 (November 1975), 1362-1365.

7. Croisier, A., "Progress in PCM and Delta Modulation: Block Companded Coding of Speech Signals", 1974 Int. Zurich Seminar, Proceedings.

8. Jonston, J. D., "A Filter Family Designed for Use in Quadrature Mirror Filter Banks", Proceedings 1980 Int. Conf. on Acoustics Speech and Signal Processing, Denver, CO (April 1977), 291-294.

9. Max, J., "Quantizing for Minimum Distortion", IRE Trans. Information Theory, IT-6 (March 1960), 7-12.

10. Jakes, W. C., "Microwave Mobile Communications", J. Wiley and Sons, New York (1974).

11. Boddie, J. R., et al, "Adaptive Differential Pulse-Code-Modulation Coding", The Bell System Technical Journal, Volume 60, No. 7, September 1981, pp. 1547-1561.

12. Crochiere, R. E., et al, "A 9.6 Kb/s DSP Speech Coder", The Bell System Technial Journal, Volume 61, No. 9, November 1982, pp. 2263-2288.

13. Smith, M. J. T., et al, "A Procedure for Designing Exact Reconstruction Filter Banks for Tree-Structured Subband Coders", Proceedings of the IEEE International Conference on Acoustics, Speech and Signal Processing, March 1984, Volume 2, pp. 27.1.1-27.1.4.

14. Barnwell, T. P., et al, "A Real Time Speech Subband Coder Using the TMS32010", . . .

15. Fjallbrant, T., et al, "A Speech Signal ATC-system With Short Primary Blocklengths and Microprocessor-based Implementation", . . . , pp. 357-363.

In real time subband vocoder applications such as those generally described in the above prior art, there are at least two popular techniques for quantization and coding: (a) adaptive pulse code modulation (APCM) or the closely related adaptive differential pulse code modulation (ADPCM) and (b) block companded pulse code modulation (BCPCM). Both of these popular subband coding techniques are discussed in detail in my above-referenced Zinser et al paper which describes and compares a subband coder using the relatively high-complexity BCPCM encoding/decoding algorithm and a subband coder using the relatively low-complexity APCM encoding/decoding algorithm. This comparison reveals that an APCM subband coder gives lower subjective quality and less channel error tolerance than a BCPCM subband coder. As will be appreciated, the less complex APCM algorithm requires less memory to implement (e.g., in a digital signal processor) than does the more complex BCPCM algorithm.

As a result, it might be concluded that it would be preferable to use a BCPCM subband coder. However, the greater memory requirements for BCPCM algorithms have been discovered to exceed the available RAM capacity of some available digital signal processing (DSP) integrated circuits (e.g., the NEC 7720 integrated circuit which has only 128×16 bits of RAM).

Nevertheless, in accordance with the present invention, I have discovered that it is possible to use hybrid subband APCM/BCPCM algorithms to minimize required digital memory while still yielding 1 db or more improvement in the overall signal-to-noise ratio (and possibly better subjective voice quality) as compared to a conventional all APCM subband coder.

While in the past different encoding/decoding algorithms have sometimes been cascaded (e.g., see Crochiere et al "A 9.6-Kb/s DSP Speech Coder" which uses a time domain harmonic scaling algorithm prior to a subband coding algorithm which uses ADPCM in each subband), the use of different encoding/decoding algorithms in the various subbands of a subband coder is believed to be a novel technique. Within the context of a digital signal processor (DSP) integrated circuit implementation having limited digital memory capacity, such new hybrid subband coding techniques have been discovered to offer significant advantages.

For example, in the presently preferred exemplary embodiment, an audio signal bandwidth of 180 to 2900 Hz is divided into four octaves. Given that perhaps only one of those octave subbands can be handled with the more complex BCPCM algorithm, I have chosen the highest treble band (e.g, 1450–2900 Hz) as being the preferable subband for BCPCM coding. In the exemplary embodiment, so as to achieve a total output rate of 9,244 bits per second, this highest subband must be coded with no more than about $1\frac{1}{8}$ bits per sample. Accordingly, in the exemplary embodiment, the real time digital signal processor implements BCPCM by encoding a 16-sample block with 16 sign bits and 5 bits of gain magnitude data. This results in an output rate of 21/16 or 1.3125 bits per sample. Furthermore, such a technique requires only two words of computer memory in a 16-bit architecture. Namely, one 16-bit FIFO buffer for the sign bits and one 16-bit buffer in which to accumulate the gain magnitude.

I have discovered that when such a hybrid subband coder is applied to typical voice signals, the hybrid scheme yields approximately one decibel better signal-to-noise ratio (e.g., 4 db vs. 3 db and perhaps even more) as when compared to a similar all APCM subband coder (e.g., one which uses $1\frac{1}{8}$ bits per sample for the highest treble subband).

These as well as other advantages, objects and features of the invention will be better appreciated by careful study of the following detailed description of the presently preferred exemplary embodiment of this invention in conjunction with the accompanying drawings, of which:

FIG. 4 is a functional block diagram of an exemplary BCPCM coder/decoder of the type generally depicted in FIG. 2 and which may also be implemented by properly programming the digital signal processor (DSP) circuits of FIG. 1;

FIG. 5 is a general functional flow diagram of a transmit operation in the exemplary embodiment;

FIG. 6 is a flow diagram of an exemplary receive operation in the exemplary embodiment.

Figure 1:
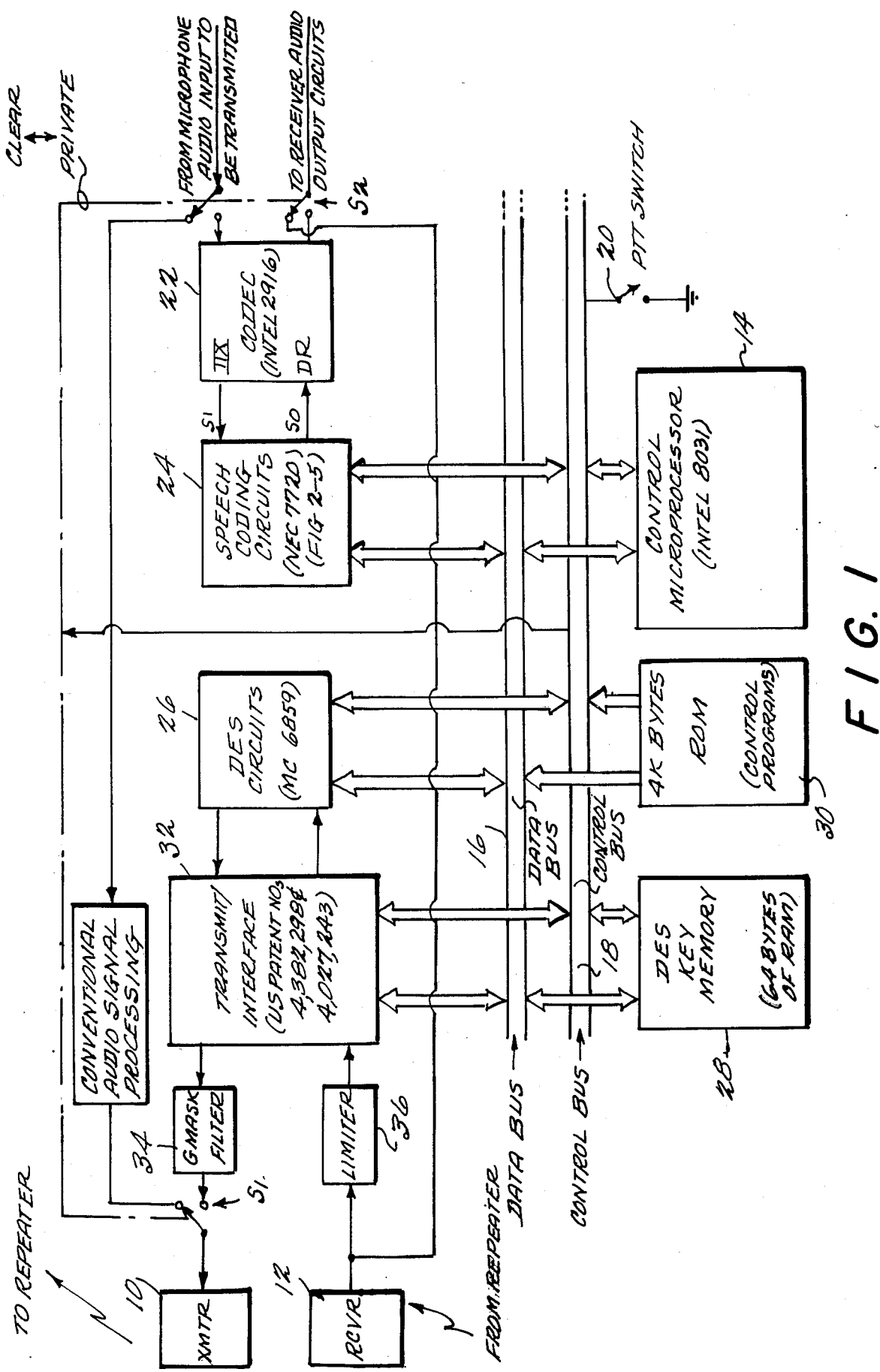
FIG. 1 is a schematic block diagram of the hardware and overall hardware architecture which may be utilized to implement this invention.

The transceiver of FIG. 1 includes the usual radio frequency transmitter 10 and radio frequency receiver 12. As indicated in FIG. 1, the transceiver may be in communication with one or more repeaters or other transceivers or base station(s) over a radio frequency communication channel. The clear/private switches S1, S2 may be provided so that the transceiver can operate in a conventional "clear" mode as well as the cryptographic or "private" mode. For example, when the switches are in the "clear" mode as shown in FIG. 1, the audio input coming from a microphone and to be transmitted is simply directly connected to transmitter 10 while the output of receiver 12 is directly connected to the usual receiver audio output circuit.

However, when switches S1, S2 are moved to the "private" mode position, then the microprocessor controlled remainder of the FIG. 1 circuitry is switched into operation between the usual receiver audio input/output circuits and the usual radio frequency transmitter/receiver circuits 10, 12. In particular, the microprocessor controlled circuitry will take conventional audio input signals (e.g., from a microphone or audio amplifier or the like) and convert those to a stream of cryptographically encoded digital signals input at switch S1 to the modulator of transmitter 10. On the receiving side, a stream of digital signals arrives via the detector output of receiver 12 and is ultimately decoded and converted into analog audio signals at the lower contact of switch S2 before being passed onto the usual receiver audio output circuits (e.g., audio amplifiers, loudspeakers, etcetera).

The overall architecture of the microprocessor control circuits shown in FIG. 1 is generally conventional. In particular, the heart of the system is a control microprocessor 14 (e.g., an Intel 8031 integrated circuit chip). Communication with the remainder of the digital circuitry is via the usual data bus 16 and control bus 18. The usual push-to-talk (PTT) switch 20 may be considered as one wire in the control bus 18 if desired. The system may include a conventional codec 22 (e.g., an Intel 2916 integrated circuit chip) and speech coding circuits 24 in the form of a suitably programmed Digial Signal Processor (e.g., an NEC 7720 integrated circuit chip) for converting audio signals to/from digital-analog form in accordance with speech digitization and processing algorithms to be described.

The Data Encryption Standard is implemented via conventional DES circuits 26 (e.g., an MC 6859 integrated circuit chip) and a conventional DES key memory 28 (e.g., 64 bytes of RAM). Suitable conventional ROM circuits 30 (e.g., 4 kilobytes) are also provided to physically embody the program control structure for overall organizational control of the system as indicated in FIG. 1.

The transmit/receive interface circuits 32 are sometimes referred to as "modem" circuits and may also be of conventional design. They preferably include bit restoration circuits of the type described in commonly assigned U.S. Pat. No. 4,382,298 Evans. Although conventional clock recovery and up/down counter circuits may be used, the preferred embodiment may use the clock recovery arrangement described in copending commonly assigned Evans application Ser. No. 527,471 filed Aug. 29, 1983 (now U.S. Pat. No. 4,546,486 issued Oct. 8, 1985 and/or the up/down counter circuits described in the copending commonly assigned Evans application Ser. No. 527,470 filed Aug. 29, 1983. Reference may also be had to the commonly assigned U.S. Pat. No. 4,027,243—Stackhouse et al for digital transmit/receive modem interface circuits suitable for use with radio frequency transmitters and receivers such as transmitter 10 and receiver 12 and for a hardwired Barker code sync word detector. In the preferred exemplary embodiment, the interface 32 may be placed in a "sync search" mode whereupon such a Barker code sync word detector is activated and which thereupon outputs a priority interrupt signal to control microprocessor 14 wherever such a sync word is detected.

The data format used in the preferred embodiment is set forth in the above-referenced related Szczutkowski et al applications Ser. Nos. 661,598 and 661,733, however it need not be used to practice the presently claimed invention. Any conventional data format may be used. Similarly, the time delay compensation used in conjunction with quadrature mirror filter (QMF) banks is preferably inserted after the coding step (during transmission) and prior to the decoding step (during reception) as explained more fully in the above-referenced related Szczutkowski applications. This minimizes the memory required for implementing such time delays and is thus useful in permitting implementation using but a single DSP with limited memory capacity. However conventional time delay compensation may also be used, if desired, in the practice of the presently claimed invention. Thus, neither of the related Szczutkowski et al or Szczutkowski inventions is needed to practice the present invention.

A conventional Gaussian Minimum Shift Key (GMSK) filter 34 (e.g., a fourth order low pass Bessel filter having an about 5 Hz cut-off measured at the 3 dB points) is preferably included to process the stream of digital output signals before they are passed onto the modulator of transmitter 10 as should be appreciated by those in the art.

The output of receiver 12 (e.g., from an fm discriminator) is also preferably passed through a conventional limiter circuit 36 to eliminate d.c. bias effects that otherwise might be present in the output of the receiver discriminator. For example, the limiter 36 may utilize a simple comparator to compare the instantaneous incoming signal from receiver 12 with a running averaged value over some previous relatively short interval as should also be appreciated by those in the art.

The transmit/receive interface 32 may, for example, on the transmit side comprise a conventional parallel-to-serial shift register for generating a serial stream of digital binary signals to be transmitted. On the receive side, the transmit/receive interface 32 may typically utilize a digital phase locked loop for achieving bit synchronization and a hardwired correlator for recognizing a predetermined Barker code which may be used for achieving word synchronization.

Those skilled in the art will understand that modern DSP circuits are now available which may be appropriately programmed (e.g., microcoded) so as to implement desired filtering and time delay functions as well as encoding/decoding algorithms (e.g., ADPCM/BCPCM), multiplexing, demultiplexing, etc., functions. Indeed, in the presently preferred exemplary embodiment, an NEC 7720 digital signal processor (DSP) 24 in FIG. 1 is so programmed. However, to better understand the functional significance of the various digital signal processing steps and to thus facilitate their implementation through proper programming, it is common to utilize functional block diagrams of the type depicted in FIGS. 2–4. Once the necessary functions have thus been defined in functional block diagram form, those skilled in this art will readily understand how to program an appropriate digital signal processor (DSP) to implement those functions which, within any given block, are conventional and well known.

The use of a hybrid subband encoding/decoding algorithm as described and claimed in the present application is a major reason why the speech coding can, if desired, be accomplished on a single DSP integrated circuit chip having limited memory capacity (e.g., the NEC 7720). In addition, to further conserve the use of memory, the presently preferred exemplary embodiment implements the necessary time delay compensation after the encoding step (in the transmitter function) and before the decoding function (in the receiver function). This is the subject of the above-referenced related invention of Szczutkowski. By performing the required time delay compensation between the coder/decoder functions where the signals are most tightly compressed (e.g., where the fewest number of bits per second pass), the memory required to implement the time delay compensation is minimized as should now be appreciated.

There are, of course, other digital signal processors having less severe memory constraints which might alternatively be used to practice the present invention of hybrid subband encoding/decoding. It may be implemented, for example, using a main frame processor as the system signal processor. And plural DSP chips could also be utilized to achieve the hybrid subband coding of this invention. Thus, in situations where memory constraints are less critical but where, perhaps, some other equivalent constraint exists (e.g., a limited bandwidth communication channel), the use of hybrid subband coding/decoding techniques in accordance with the present invention can be utilized to provide significantly improved signal-to-noise ratio and/or other benefits.

In these latter instances, the improved time delay compensation scheme of Szczutkowski may not be required or even desired.

Figure 2:
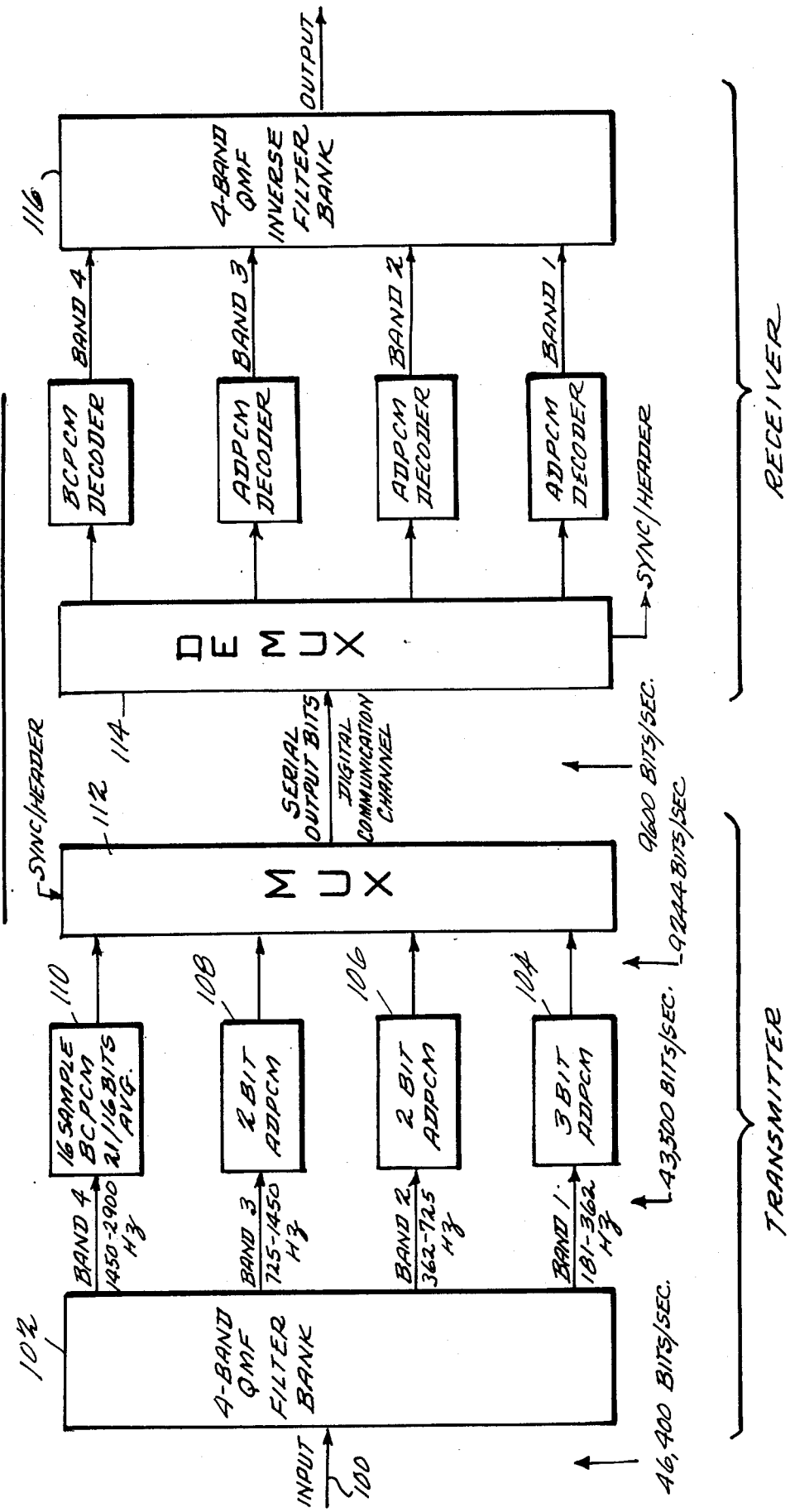
FIG. 2 is a functional block diagram of an exemplary hybrid subband coder in accordance with this invention of the type which may be implemented by the digital signal processing or "speech coding circuits" shown in FIG. 1.

In the functional block diagram of FIG. 2, the input signal at 100 is already a digitized version of an input analog audio signal. For example, it may be a serial bit string coming from codec 22 in FIGURE 1 into an input buffer register of the DSP 24 of FIG. 1. The signal present at input 100 will typically represent an input electrical signal having a frequency band of components (e.g., from about 180 to 2900 Hz).

Well known quadrature mirror filter (QMF) banks (e.g., the conventional non-symmetrical tree structure which simplifies and/or minimizes computational requirements for real time applications such as this) are utilized in the four-band QMF bank 102 of FIG. 2. The QMF filters separate the input signal into plural channels of digital signals representing audio signal components in different subbands of frequency range. For example, as depicted in FIG. 2, bands 1–4 represent a four-octave division of the 180–2900 Hz input bandwidth.

Typically, a well known QMF tree structure is utilized with $h_e$ and $h_o$ filter pairs being utilized in a non-symmetrical tree structure to separate the incoming digital signal into octavely related bands. Each filter pair basically comprises a tapped digital delay line. The first filter pair may, for example, provide the highest frequency band 4 and an input to a second filter pair. The output of the second filter pair then provides band 3 and an input to a third filter pair which, in turn, provides band 2 and an input to yet a fourth pair of filters which, finally, produces band 1 output (the second output of the fourth filter pair is simply not used).

As will thus be noticed, bands 2, 3 and 4 have fewer filter elements contained in their signal path and therefore suitable time delay must be added in each such band so as to maintain time synchronization in the propagation of corresponding signal components in the different bands throughout the system. As will be appreciated, the necessary time delay compensation can be accomplished either at the transmit side or the receive side or divided as desired between both the transmit and receive sides. For example, if the four QMF filter pairs employed are 32, 16, 16, 16 point filters, then the corresponding time delay compensation for bands 4, 3 and 2 would be 49, 21 and 7 filter processing times, respectively. The exact value of the required time delay compensation depends upon the number of points used in each filter pair. For example, if 32, 16, 12, 8 point filter pairs are used, then the required time delay units would be 28, 11 and 3 for bands 4, 3 and 2, respectively. The general considerations and a formula for calculating such time delay compensation is set forth in my related and above-referenced Zinser et al paper.

Although such time delay compensation is conventionally performed immediately after QMF filtering, if it is desired to maximize conservation of digital memory requirements in the digital signal processor 24, then such time delay compensation may be made after the further bandwidth compression ADPCM/BCPCM encoding steps in accordance with the Szczutkowski invention as previously mentioned.

As also shown in FIG. 2, the band 1 output of the QMF filter bank 102 is passed to a conventional 3-bit ADPCM encoder 104. The band 2 output is processed by a conventional 2-bit ADPCM encoder 106. The band 3 output from the QMF filter 102 is processed by a conventional 2-bit ADPCM encoder 108. However, the band 4 output from the QMF filter 102 passes to a BCPCM encoder 110 thus making the subband coder of a hybrid ADPCM/BCPCM type. As will be explained more fully below, APCM is merely a special case of ADPCM and, accordingly, either technique may be employed in the coders 104, 106 and 108.

The multiplexing function 112 depicted in FIG. 2 takes the serial bit strings coming from encoders 104, 106, 108 and 110 and converts them into a single serial output bit string for passage along a digital communication channel. Typically, the multiplexing function 112 is implemented in the DSP 24 by simply buffering the serial outputs from the encoding processes 104-110 and then packing them in a predetermined order for output as a single serial bit string.

Although not depicted in FIG. 2, if encryption of the transmitted bit string is desired, then the serial bit string from multiplexing function 112 may actually pass to the DES circuits 26 for encoding in accordance with the DES encryption algorithm after which the resulting encoded data bytes are buffered and packed and then converted from bit-parallel to bit-serial form before being output through filter 34 to the transmitter modulator. This entire overall transmit operation from microphone to modulator is functionally depicted at FIG. 5.

Whether DES encrypted or not, the receiver portion shown in FIG. 2 will eventually be the recipient of a serial string of bits similar to those originally generated by the multiplex function 112. For example, as depicted in FIG. 6, the incoming bit-serial string from the receiver discriminator typically passes through limiter 36 and then is converted from bit-serial to bit-parallel form before it is buffered, unpacked and processed conventionally by the DES circuits 26 so as to decrypt the incoming data and provide a decrypted serial string of bits to be buffered and unpacked (i.e., demultiplexed as indicated by function 114 in FIG. 2) so as to produce an appropriate bit-serial string for each of the bands 1 through 4 to be decoded.

Bands 1 through 3 are, of course, decoded in accordance with a conventional ADPCM decoding algorithm while band 4 is decoded with a conventional BCPCM decoding algorithm as depicted in FIG. 2. The resulting four strings of bit-serial decoded signals for bands 1-4 then pass through a conventional fourband QMF inverse filter bank 116 where they are combined into a single bit-serial output string. Finally, as depicted in FIG. 6, the bit-serial output of the subband decoder passes through a conventional digital-to-analog converter (e.g., codec 22) to produce an audio analog signal suitable for processing by conventional receiver audio output circuits.

Figure 3:
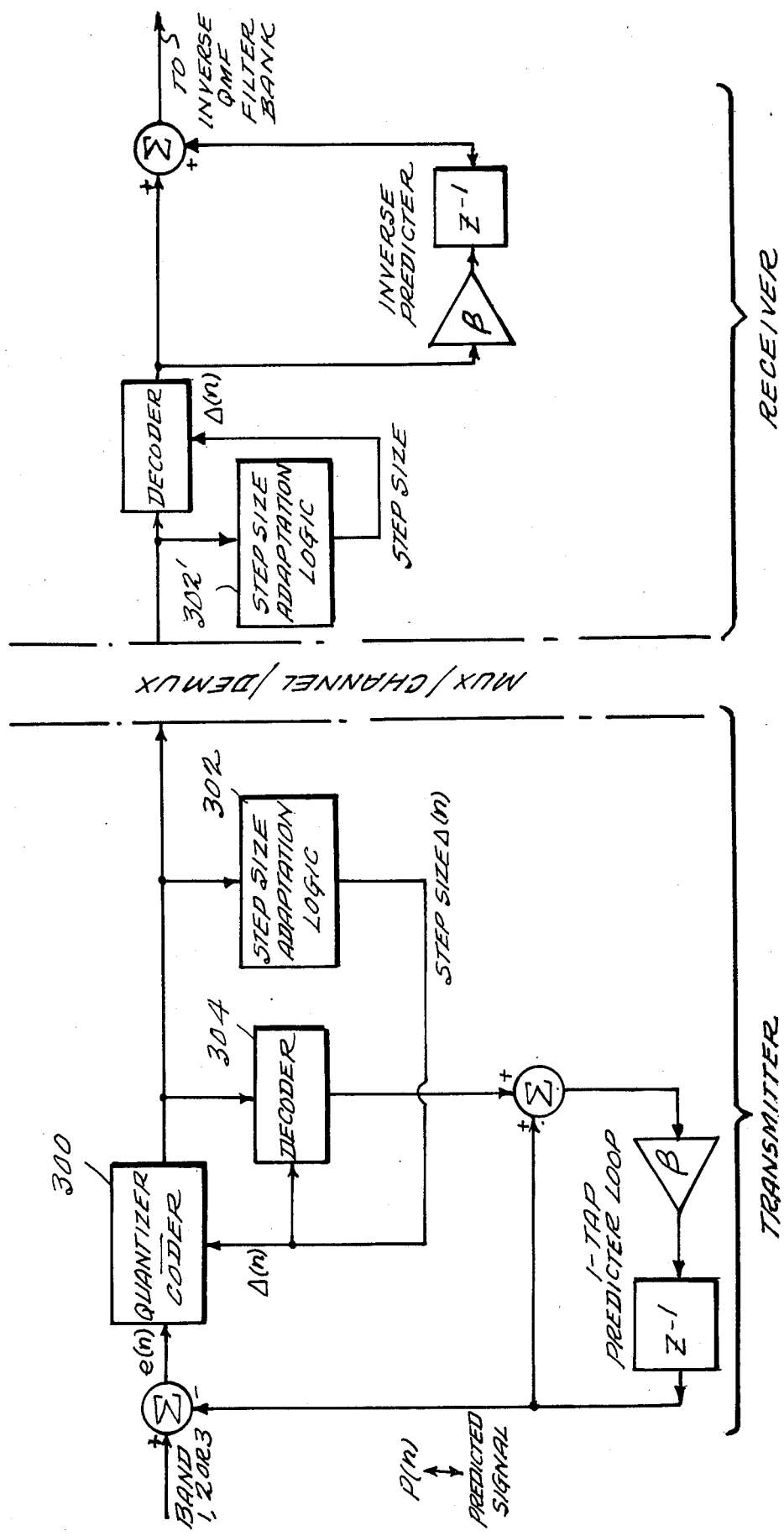
FIG. 3 is a functional block diagram of an exemplary ADPCM coder/decoder of the type depicted in FIG. 2 and which can also be implemented by proper programming of a digital signal processor (DSP) such as that shown in FIG. 1.

Although the ADPCM and BCPCM encoding/decoding functions are conventional and well known in and of themselves (as is their straightforward implementation on programmable digital signal processors), these functions have been again depicted for easy reference at FIGS. 3 and 4.

For example, FIG. 3 depicts a typical functional diagram of an ADPCM coder/decoder. If the digital output of quantizer/coder 300 is at the outer levels of its present range, then the step size adaptation logic 302 detects this fact and increases the step size used by the quantizer 300. On the other hand, if the quantizer 300 is detected as outputting only in the inner levels of the current range, then the step size is decreased. If only the quantizer 300 and the step size adaptation logic 302 are utilized, then the device is actually an APCM coder. The addition of the decoder 304 and the rest of the 1-tap predictor loop depicted in FIG. 3 (including the summation nodes) makes the coder an adaptive *differential* PCM coder. As should be appreciated, if the gain factor $\beta$ is made to equal zero, the ADPCM coder again becomes an APCM coder. As used in this application, the terms APCM and ADPCM are considered as being synonymous. Both APCM and ADPCM are examples of well recognized "backward adaptive" encoding algorithms (e.g., the current step size is adapted as a function of past signals: which require relatively small amounts of memory to implement.

The step size adaptation logic 302' in the receiver of FIG. 3 uses essentially the same logic based on the ongoing bit string values as does the logic 302 in the transmitter. However, because transmission errors occurring in the channel may cause incorrect adaptation in the receiver, an exponential decay factor is preferably used in both the transmitter logic 302 and the receiver logic 302' so as to damp out any such errors. More detail on the exponential decay feature may be had by reading my related above-referenced Zinser et al paper. In brief, the adaptation equation used by logic 302' may be of the following form:

$$d(n) = 0.98[d(n-1)] + m[I(n)] \quad \text{(Equation 1)}$$

where
- d(n) is step size table pointer
- I(n) is quantizer level
- m[I(n)] is step size pointer update as a function of level.

The variable d(n) is typically constrained to be between the values 1 and 64. The step size [Δ(n)] at time n is found by using the integer value of d(n) as an index to a look up table. The look up table contains 64 exponentially spaced step sizes that span the desired dynamic range of the system.

A typical m[I(n)] table for a 3-bit quantizer is:

TABLE 1

| I(n) | M | |
|---|---|---|
| 1 | 8 | −numbers |
| 2 | 0 | |
| 3 | 0 | |
| 4 | −3 | |
| | | zero level |
| 5 | −3 | +numbers |
| 6 | 0 | |
| 7 | 0 | |
| 8 | 8 | |

(More information can be found on this technique in Boddie, Ref. 11.)

Once again, if the inverse predictor loop is simply omitted, one is left with APCM decoder. With it in place, one has a ADPCM decoder as should be apparent to those in the art.

A typical functional block diagram for a BCPCM coder/decoder is set forth at FIG. 4. Here, the band 4 samples from the QMF filter are quantized at 400 to produce a simple serial bit string where each bit in the string represents either a plus or a minus sign directed step. The size of the step used for each block of 16 samples is derived by computing the average absolute value of those 16 samples via functions 404A and 404B. FIFO buffer 402 holds the 16 samples during the gain computation process; it ensures that the encoded samples and gain are received in synchrony at the receiver. This buffer register may also be used as a part of the time delay compensation buffer for band 4. The result of the gain computation is then quantized at 406 (e.g., using 4 or 5 bits or the like) and then multiplexed at 408 so as to produce a bit-serial string for output to the frame multiplexer 112 shown in FIG. 2. BCPCM is an example of well recognized "forward adaptive" encoding algorithms (e.g., the step size is adapted as a function of past and future signals which must therefore be buffered before quantization can occur) which require relatively large amouunts of memory to implement.

After passage through the channel and the demultiplexer 114, the band 4 signals are demultiplexed at 410 into string of serial sign bits at 412 and a multibit quantized gain signal at 414 which is decoded at 416 to set the desired step size within decoder function 418. As indicated in FIGURE 4, increments using the decoded step size will be successively added and/or subtracted as successive sign bits are decoded at 418 so as to provide an output to the receiver QMF inverse filter bank 116 as shown in FIG. 2.

As will be appreciated by those in the art, the effective sampling for each band should be equal to the Nyquist frequency for the highest frequency component within that band. The resulting data rates will be a function not only of the sampling rate but also of the number of bits used to represent each sample of the voice signal. For example, using an approximately 5800 Hz overall sampling rate, the following Table 2 illustrates one possible exemplary arrangement for achieving an overall data rate of 9600 bits per second over the communication channel. The bandwidth compression achieved at each successive point in the functional diagram of FIG. 2 shows the type of overall bandwidth compression that may be achieved using the hybrid subband coding technique of this invention.

TABLE 2

| Band (Hz) | Sample Rate (Hz) | Bits/Sample | Bits/Sec |
|---|---|---|---|
| 181–362.5 | 362 | 3 | 1087.5 |
| 362.5–725 | 725 | 2 | 1450 |
| 725–1450 | 1450 | 2 | 2900 |
| 1450–2900 | 2900 | 1.3125 | 3806.25 |
| | | Total SBC | 9243.75 |
| | Frame Sync & Header | | 356.25 |
| | | Data Rate | 9600 |

As will be appreciated, synchronization signals and perhaps other "overhead" information is typically also multiplexed into the transmitted serial stream and allowances are thus made for same in Table 2. Although any conventional transmitted bit format may be used with this invention, the preferred format is given in the above-referenced related Szczutkowski et al application.

Figure 7:
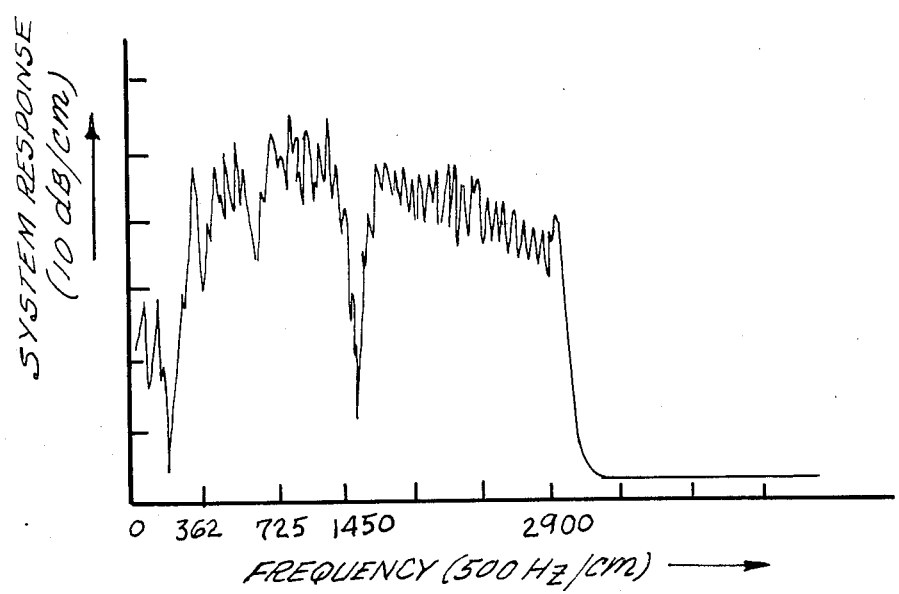
FIG. 7 is a graph depicting the non-overlapping subbands utilized in the preferred exemplary embodiment so as to minimize distortion otherwise caused by the relatively coarse quantization steps necessarily utilized in the exemplary embodiment ADPCM/BCPCM hybrid subband coder/decoder.

Because relatively coarse quantizing steps are utilized in this exemplary embodiment, it is believed preferable that the subbands do not actually overlap. Accordingly, the juncture between the subbands will actually lie on a depression in the overall frequency response characteristic of the entire system. For example, as shown in FIG. 7, the juncture between the subbands within the overall frequency response of the system may occur at points that are a number of decibels below the peak in-band bandpass levels.

Although only one exemplary embodiment of this invention has been described in a detail, those skilled in the art will recognize that there are many possible modifications and variations which may be made in the details of this exemplary embodiment while yet retaining many of the novel advantages and features of this invention. Accordingly, all such modifications and variations are intended to be included within the scope of the appended claims.

What is claimed is:

1. In a subband coder including means for processing an input electrical signal having a frequency band of signal components by separating it into plural frequency subbands of signal components which subband are separately encoded into corresponding binary-valued digital signals that are subsequently combined for transmission over a common digital communication channel, the improvement comprising:
   hybrid encoding means which encodes the signal components of at least one of said subbands in accordance with a backward adaptive encoding algorithm and which encodes the signal components of at least one other of said subbands in accordance with a forward adaptive encoding algorithm.

2. An improved subband coder as in claim 1 wherein said hybrid encoding means includes APCM means for effecting adaptive pulse code modulation as said backward adaptive encoding algorithm and BCPCM means for effecting block companded pulse code modulation as said forward adaptive encoding algorithm.

3. An improved subband coder as in claim 2 comprising means for defining four octave subbands covering an overall frequency band of approximately 180 to 2900 Hz and wherein the highest frequency subband is BCPCM encoded using a 1-bit BCPCM quantizer while the three lowest frequency subbands are APCM encoded.

4. A hybrid subband electrical signal processor comprising:
   filter means having an input for accepting digital electrical signals representing a band of frequency components and having plural outputs each producing digital subband signals representing signal components of the input electrical signal within different frequency subbands;
   first digital encoder means for receiving the digital subband signals from one of said outputs and for encoding such received subband signals in accordance with a backward adaptive encoding algorithm which determines a current quantization step size based only on past signals using a first capacity memory to produce a first encoded digital signals;
   second digital encoder means for receiving the digital subband signals from anohter of said outputs and for encoding such received subband signals in accordance with a forward adaptive encoding algorithm which determines quantization step size based on future as well as past signals using a second capacity memory, larger than said first capacity memory, to produce second encoded digital signals; and
   multiplex means for combining said first and second encoded digital signals into a common string of digital signals for transmission over a digital signal communication channel.

5. A hybrid subband electrical signal processor as in claim 4 wherein:
   said first encoder means uses an APCM encoding algorithm and said second encoder means uses a BCPCM encoding algorithm.

6. A hybrid subband electrical signal processor as in claim 5 wherein said filter means provides four octave subbands covering an overall frequency band of approximately 180 to 2900 Hz and wherein the highest frequency subband is BCPCM encoded using a 1-bit BCPCM quantizer while the three lowest frequency subbands are APCM encoded.

7. A hybrid subband electrical signal processor as in claim 4, 5 or 6 further comprising:
   demultiplex means for separating an incoming bit-serial string of digital signals into plural subband channels having therein encoded incoming digital signals representing signal components within different frequency subbands;
   first digtal decoder means for receiving said encoded incoming digital signals in at least one of said subband channels and producing decoded incoming digital signals therefrom in accordance with a backward adaptive decoding algorithm;
   second digital decoder means for receiving said encoded incoming digital signals in at least one other of said subband channels and producing decoded incoming digital signals therefrom in accordance with a forward adaptive decoding algorithm;
   inverse filter means for accepting said decoded incoming digital signals from each subband channel and for producing a decoded string of digital signals.

8. A hybrid subband electrical signal processor as in claim 7 wherein:
   said first decoder means uses an APCM decoding algorithm and said second decoder means uses a BCPCM decoding algorithm.

9. A hybrid subband electrical signal processor as in claim 8 wherein said inverse filter means combines four octave subbands covering an overall frequency band of approximately 180 to 2900 Hz and wherein the highest frequency subband is BCPCM decoded while the three lowest frequency subbands are APCM decodes.

10. In a subband signal processing method for processing an input electrical signal having a frequency band of signal components by separating it into plural frequency subbands of signal components which subbands are separately encoded into corresponding binary-valued digital signals that are subsequently combined for transmission over a common digital communication channel, the improvement comprising:
    encoding the signal components at least one of said subbands in accordance with a backward adaptive encoding algorithm and encoding the signal components of at least one other of said subbands in accordance with a forward adaptive encoding algorithm.

11. An improved subband signal processing method as in claim 10 wherein adaptive pulse code modulation is used as said backward adaptive encoding algorithm and block companded pulse code modulation is used as said forward adaptive encoding algorithm.

12. An improved subband signal processing method as in claim 11 wherein four octave subbands covering an overall frequency band of approximately 180 to 2900 Hz are utilized and wherein the highest frequency subband is BCPCM encoded while the three lowest frequency subbands are APCM encoded.

13. A hybrid subband electrical signal processing method comprising:
    accepting digital electrical signals representing a band of frequency components and producing plural outputs each having digital subband signals representing signal components of the input electrical signal within different frequency subbands;
    receiving the digital subband signals from one of said outputs and encoding such received subband signals in accordance with a backward adaptive encoding algorithm to produce first encoded digital signals;
    receiving the digital subband signals from another of said outputs and encoding such received subband signals in accordance with a forward adaptive encoding algorithm to produce second encoded digital signals; and
    combining said first and second encoded digital signals into a common string of digital signals for transmission over a digital signal communication channel.

14. A hybrid subband electrical signal processing method as in claim 13 wherein:
    an APCM encoding algorithm and a BCPCM encoding algorithm are simultaneously used in respective ones of said receiving steps.

15. A hybrid subband electrical signal processing method as in claim 14 wherein four octave subbands are used covering an overall frequency band of approximately 180 to 2900 Hz and wherein the highest frequency subband is BCPCM encoded while the three lowest frequency subbands are APCM encoded.

16. A hybrid subband electrical signal processing method as in claim 13, 14 or 15 further comprising:
   separating an incoming string of digital signals into plural subband channels having therein encoded incoming digital signals representing signal components within different frequency subbands;
   receiving said encoded incoming digital signals in at least one of said subband channels and producing decoded incoming digital signals therefrom in accordance with a backward adaptive decoding algorithm;
   receiving said encoded incoming digital signals in at least one other of said subband channels and producing decoded incoming digital signals therefrom in accordance with a forward adaptive decoding algorithm; and
   accepting said decoded incoming digital signals from each subband channel and producing a decoded string of digital signals.

17. A hybrid subband electrical signal processing method as in claim 16 wherein:
   an APCM decoding algorithm and a BCPCM decoding algorithm are simultaneously used in respective ones of decoding steps.

18. A hybrid subband electrical signal processing method as in claim 17 wherein said accepting step combines four octave subbands covering an overall frequency band of approximately 180 to 2900 Hz and wherein the highest frequency subband is BCPCM decoded while the three lowest frequency subbands are APCM decoded.

* * * * *